(12) United States Patent
Azema

(10) Patent No.: US 6,274,264 B1
(45) Date of Patent: Aug. 14, 2001

(54) CELL CURRENT CUTOFF MECHANISM

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/386,110

(22) Filed: Aug. 30, 1999

(30) Foreign Application Priority Data

Aug. 31, 1998 (JP) .................................................. 10-245497

(51) Int. Cl.[7] .................................................. H01M 2/12
(52) U.S. Cl. ................ 429/53; 429/54; 429/55; 429/56; 429/61; 429/72; 429/82
(58) Field of Search .................. 429/53, 54, 55, 429/56, 61, 72, 82

(56) References Cited

U.S. PATENT DOCUMENTS 4,943,497 * 7/1990 Oishi et al. .............................. 429/53
5,705,290   1/1998 Azema .
5,738,952 * 4/1998 Abe ......................................... 429/56
5,821,008 * 10/1998 Harada et al. .......................... 429/56

* cited by examiner

Primary Examiner—Carol Chaney
Assistant Examiner—Dah-Wei D. Yuan
(74) Attorney, Agent, or Firm—Brinks Hofer Gilson & Lione

(57) ABSTRACT

In a current cutoff mechanism of a cell according to the present invention, a convex portion of the diaphragm is press-fitted into a fitted part, a conductive path is formed between a cell lid and a generating element inside the cell via the diaphragm and an internal electrode and when internal pressure in a cell case exceeds a predetermined value and the diaphragm is displaced, the convex portion of the diaphragm is pulled out from the fitted part and the conductive path is cut off.

4 Claims, 5 Drawing Sheets

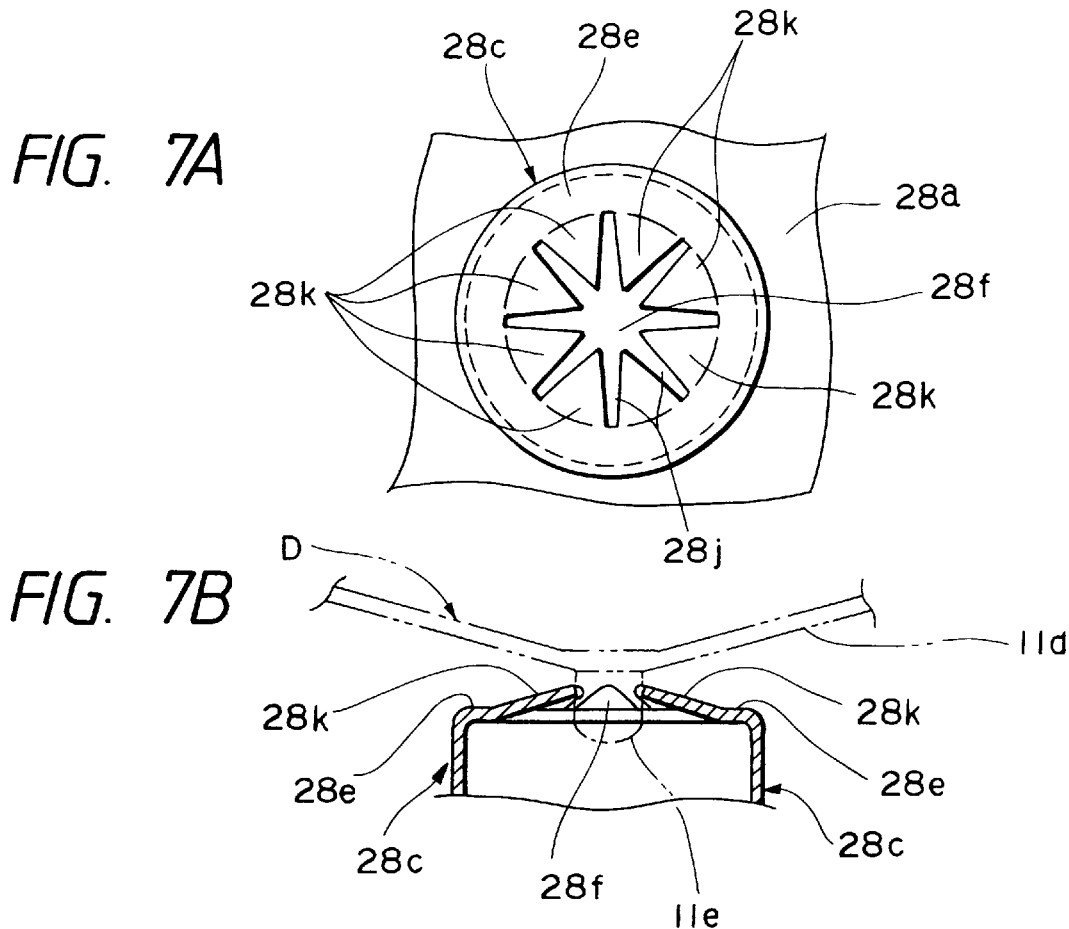
FIG. 7A
FIG. 7B
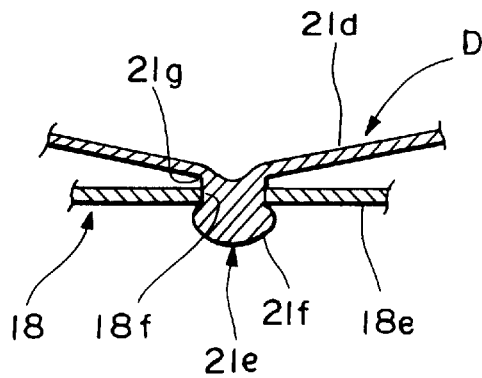
FIG. 8
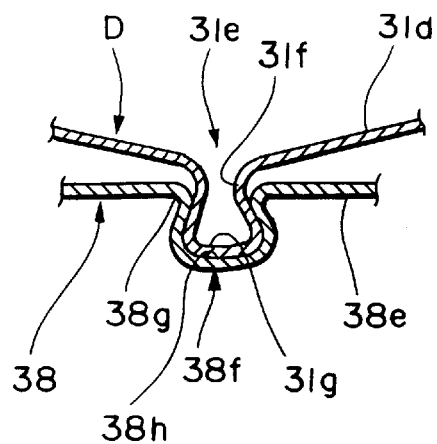
FIG. 9

CELL CURRENT CUTOFF MECHANISM

BACKGROUND OF THE INVENTION

1. Field of the Invention

The present invention relates to a current cutoff mechanism of a cell, particularly relates to a current cutoff mechanism of a cell used for securing safety when pressure inside a cell case is increased

2. Description of the Related Art

Heretofore, a sealed lithium ion secondary cell inside the case of which an electrolyte including an organic solvent for example is injected and which can be charged are widely used for a power source for portable equipment such as a mobile telephone and a personal computer However, if such a cell is excessively charged when it is charged again or is charged with larger current than defined current, abnormality occurs in the cell, gas is generated in a cell case, pressure and temperature in the cell case rise, the cell case is swollen, further a crack is formed, an inside electrolyte leaks outside and the leaked electrolyte sometimes has an adverse effect on equipment in which the cell is built.

If the use of the above cell is continued in the above abnormal state even if the above leaked electrolyte does not have an adverse effect on the equipment, the swell of the cell progresses, the cell case may burst and the use of the abnormal cell is required to be stopped promptly.

A conventional type current cutoff mechanism of a cell for preventing the burst of such a cell will be described as a circular cell shown in FIGS. 10 and 11 below. First, in a cell case 1, a cell lid 3 attached by riveting the periphery of the cell lid via a gasket 2 or welding in order to seal the inside of the cell case 1 and an actuator 4 which can be displaced above and below in the lower part of the cell lid 3 are respectively arranged.

An air vent 3a is formed in the cell lid 3 and when the actuator 4 in the lower part is displaced and cleaves its way upward air in a part between the cell lid 3 and the actuator 4 is emitted outside from the air vent 3a.

In the actuator 4, a circular relief valve 4a is formed by drawing and in the relief valve 4a, a projection 4b protruded downward in the drawings is formed in the center and a radial groove 4c is formed on the surface around the projection 4b.

An insulating plate 5 is arranged below the actuator 4 and in the insulating plate 5, a hole 5a for inserting the projection 4b of the relief valve 4a and an air vent 5b are formed.

A lead fixing member 6 is arranged below the above insulating plate 5 and in the lead fixing member 6, a hole 6a for communicating with the above hole 5a of the insulating plate 5 and an air vent 6b communicating with the air vent 5b of the insulating plate 5 are respectively provided.

The projection 4b of the relief valve 4a is inserted into the respectively holes 5a and 6a of the above insulating plate 5 and the lead fixing member 6 and a thin lead 7 made of a metallic plate is attached to the end of the projection 4b.

The thin lead 7 is provided with a junction 7a bonded to the end of the projection 4b by welding, and the actuator 4 and the lead 7 are electrically connected. The other end of the lead 7 is connected to a generating element 8 in the lower part in the drawings and a conductive path is formed between the generating element 8 and the cell lid 3.

If an abnormality occurs inside the cell and pressure inside the cell case 1 is increased, the pressure of gas is increased and the gas flows from the air vents 5b and 6b as shown by an arrow A in FIG. 11. The application force which pushes up the rear of the relief valve 4a is applied.

When concentrated stress is applied to the junction 7a of the lead 7 by application force applied to the relief valve 4a and the concentrated stress is larger than the shearing stress of the junction 7a, the junction 7a is disconnected from the lead 7, electrical connection between the lead 7 and the actuator 4 is cut off and the conductive path of the above cell is cut off.

The flow of current inside the cell is cut off by the above cutoff of the conductive path, the increase of pressure inside the cell case 1 is prevented and the cell can be prevented from bursting beforehand.

Portable equipment using such a conventional type cell (such as a mobile telephone) has become more and more miniaturized and the need has increased for the miniaturization and the thinning of the cell used for such portable equipment.

However, as the above conventional type current cutoff mechanism is formed by one plate though the lead 7 is thin, the application force of the actuator 4 varies widely depending upon variation in the thickness of the lead 7 and it is difficult to securely disconnect the junction 7a from the lead 7 when the internal pressure of the cell is increased up to a predetermined value.

As the junction 7a is disconnected as if it were torn off when the internal pressure of the cell is increased and the junction 7a is disconnected from the lead 7, a burr like a beard is made on the section of a disconnected hole 7b of the junction 7a after the junction is disconnected from the lead and it is difficult to precisely and completely cut off the conductive path between the actuator 4 displaced upward and the lead 7.

SUMMARY OF THE INVENTION

The present invention is made to solve the above problems and the object is to provide a high performance current cutoff mechanism of a cell wherein the miniaturization and the thinning are enabled and when pressure inside the cell is increased up to a predetermined value, a conductive path inside the cell can be securely cut off.

A current cutoff mechanism according to the present invention of a cell as first arrangement for solving the above problems is provided with a cell case in which a generating element is housed, a cell lid for airtightly shielding the inside of the cell case, a diaphragm connected to the cell lid, displaced according to the internal pressure of the cell case and provided with a convex portion in a part and an internal electrode provided with a fitted part for fitting the above convex portion of the diaphragm at the base, and is characterized in that the convex portion of the diaphragm is press-fitted into the above fitted part, a conductive path is formed between the cell lid and the generating element via the diaphragm and the internal electrode and when the internal pressure of the cell case is increased over a predetermined value and the diaphragm is displaced, the convex portion of the diaphragm is pulled out from the fitted part and the above conductive path is cut off.

A current cutoff mechanism according to the present invention as second arrangment for solving the above problems is characterized in that plural slits radially extended from the center of the base are formed, each triangular tongue is provided in a part between these plural slits, these plural tongues are protruded approximately in a conic shape, the above fitted part is formed by the tops of these plural tongues and the convex portion of the diaphragm is press-fitted into the fitted part.

A current cutoff mechanism according to the present invention as third arrangment for solving the above problems is characterized in that the above convex portion is formed so that the end is wider than the base fitted into the fitted part.

A current cutoff mechanism according to the present invention as fourth arrangment for solving the above problems is characterized in that the above fitted part is formed in the shape of a bag having a hollow part whose entrance is narrow and the inside is wider than the entrance and the wider end of the convex portion is press-fitted into the hollow part of the fitted part.

BRIEF DESCRIPTION OF THE DRAWINGS

FIGS. 7A and 7B are schematic drawings for explaining another embodiment of the present invention;

FIG. 8 is a schematic drawing for explaining further another embodiment of the present invention;

FIG. 9 is a schematic drawing for explaining the other embodiment of the present invention;

DESCRIPTION OF THE PREFERRED EMBODIMENTS

Figure 1:
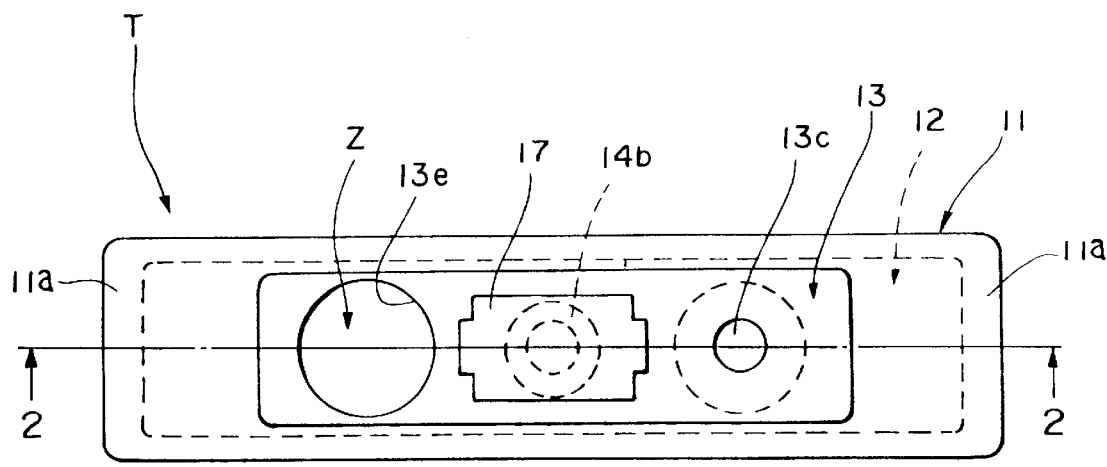
FIG. 1 is a top view according to the present invention.
Figure 2:
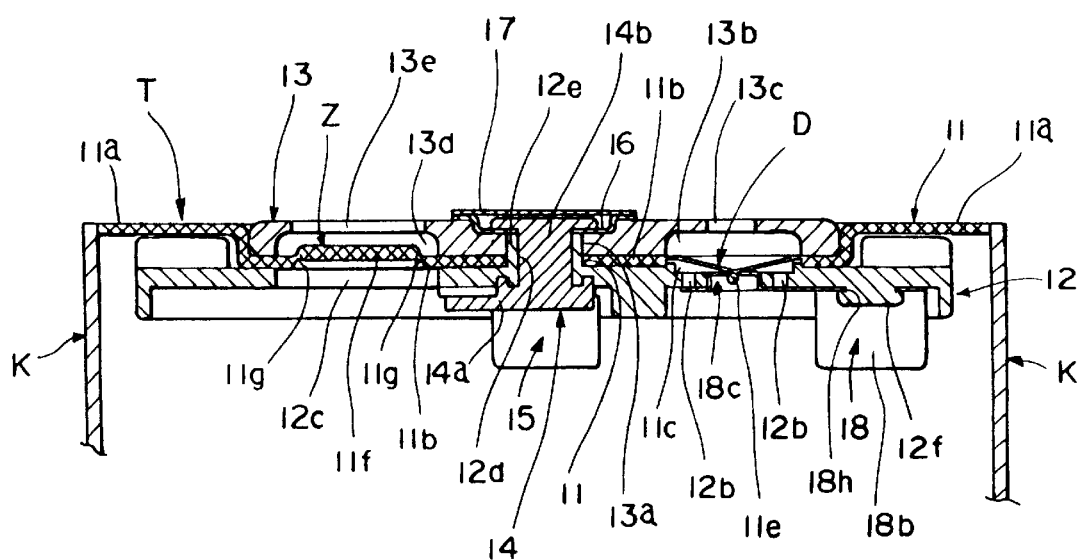
FIG. 2 is a sectional view showing a main part according to the present invention.
Figure 3:
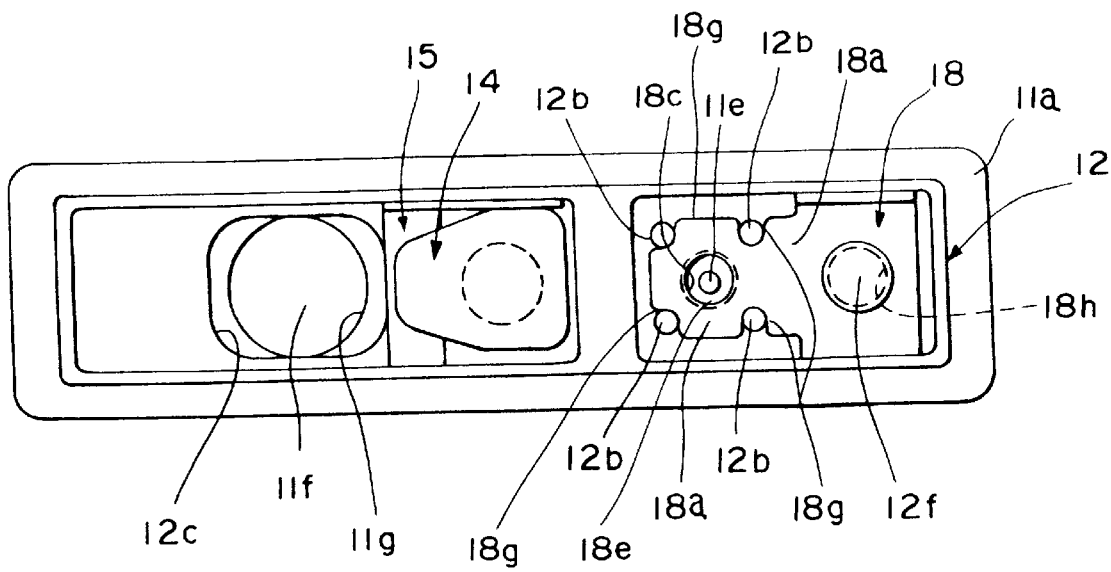
FIG. 3 is a bottom view according to the present invention.
Figure 4:
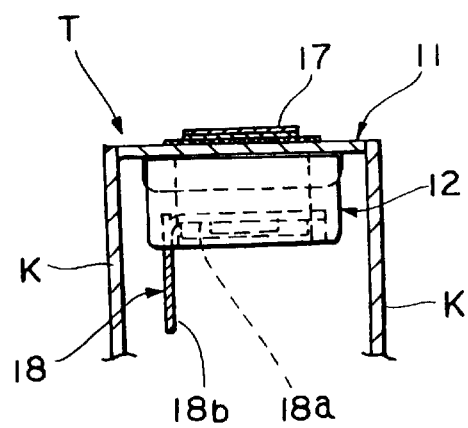
FIG. 4 is a sectional side view showing the main part according to the present invention.
Figure 5:
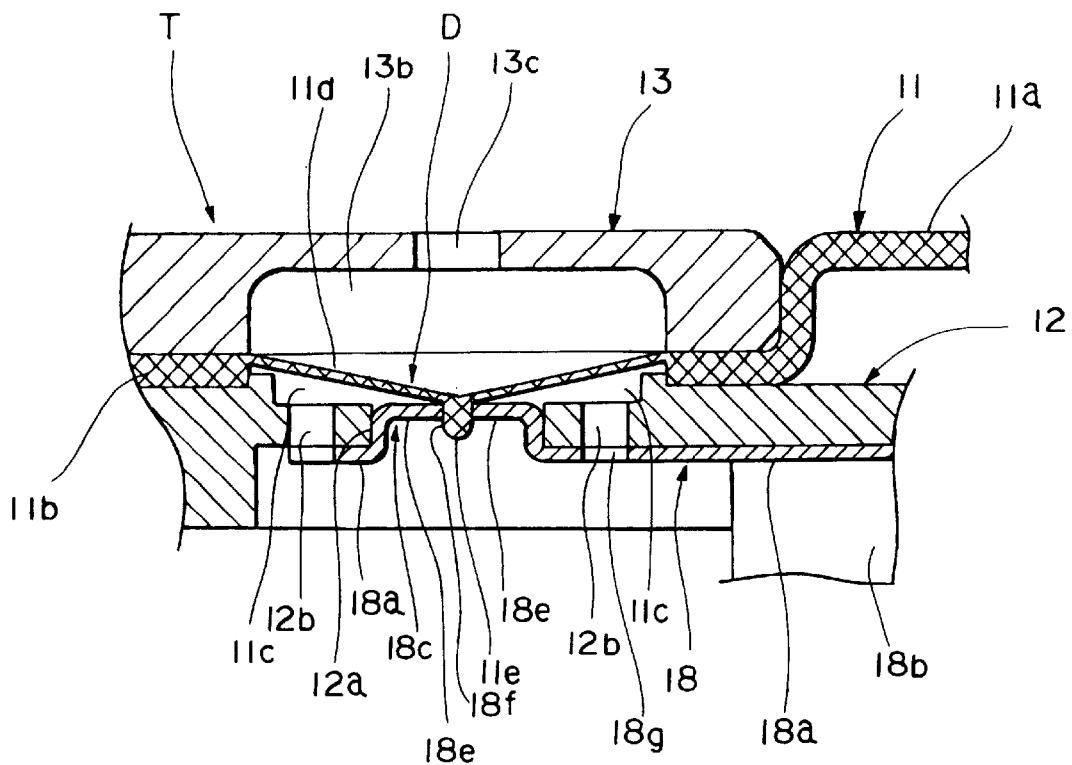
FIG. 5 is a sectional view in which a diaphragm according to the present invention is enlarged.
Figure 6:
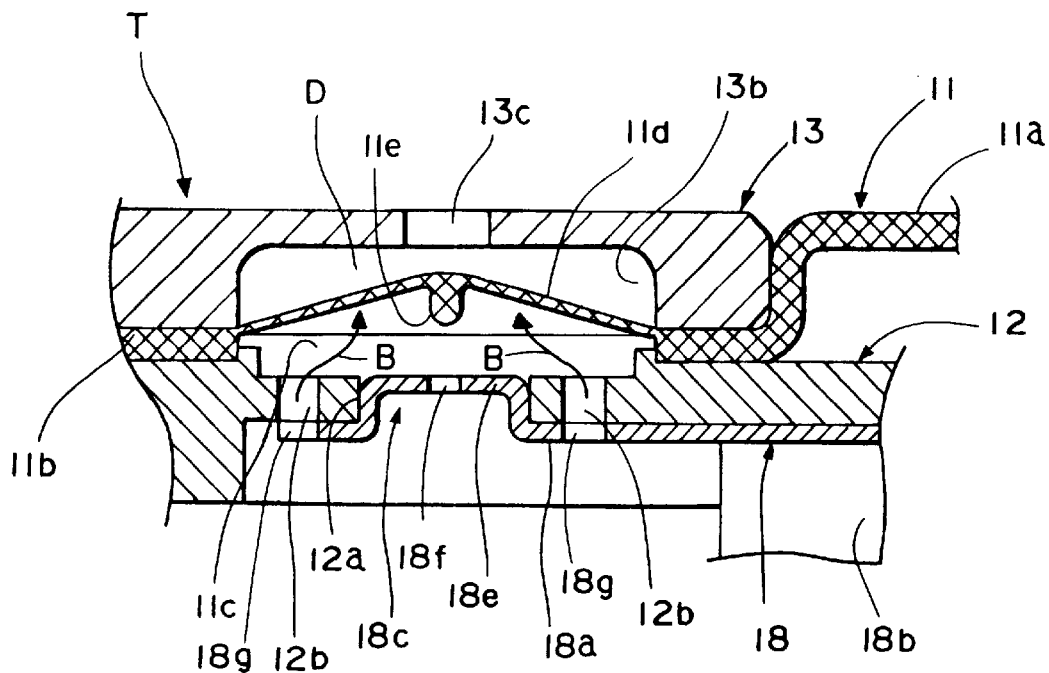
FIG. 6 is a sectional view in which the main part is enlarged for explaining the operation of the diaphragm according to the present invention.
Figure 10:
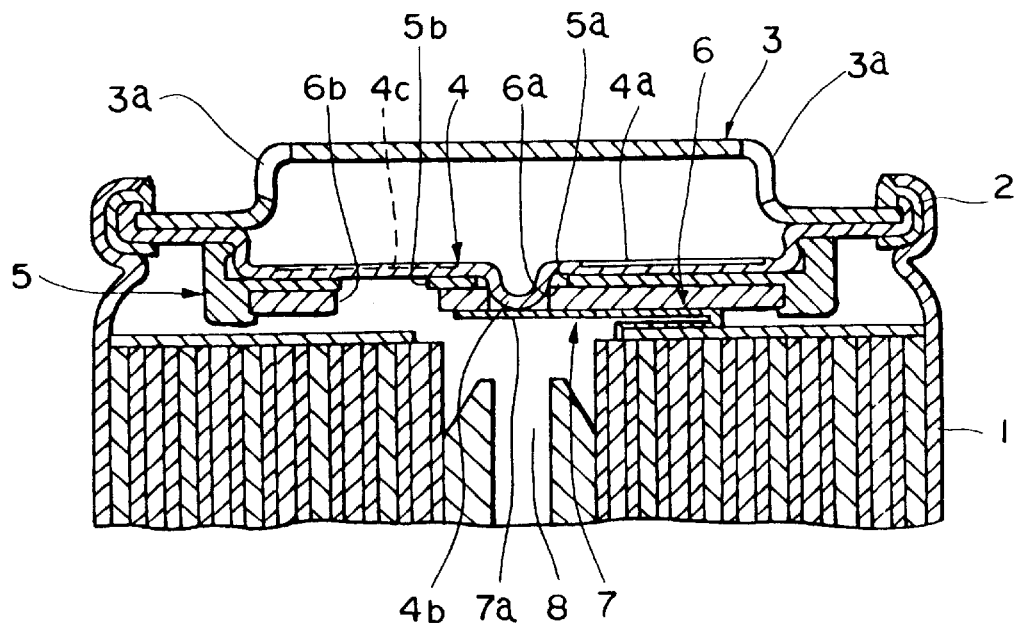
FIG. 10 is a sectional view showing the main part of a conventional type current cutoff mechanism of a cell.
Figure 11:
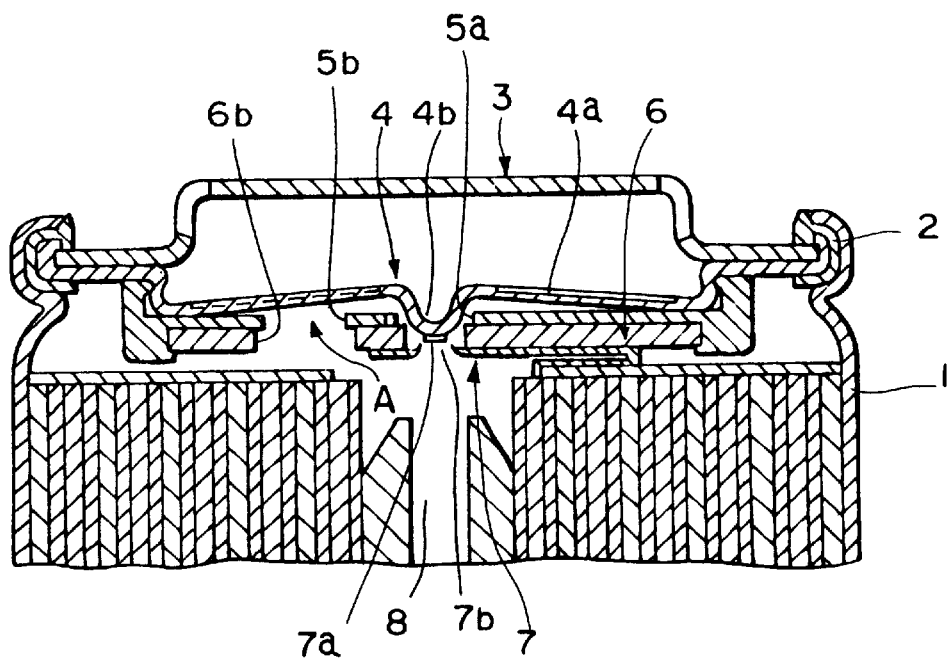
FIG. 11 is a sectional view showing the main part for explaining the operation of the conventional type current cutoff mechanism of the cell.

An embodiment of a current cutoff mechanism of a cell according to the present invention will be described below. FIG. 1 is a top view according to the present invention, FIG. 2 is the sectional view of the main part according to the present invention in a state in which the current cutoff mechanism is attached to a cell case, FIG. 3 is a bottom view according to the present invention, FIG. 4 is a sectional side view of the main part according to the present invention, FIG. 5 is a sectional view in which the main part of a diaphragm according to the present invention is enlarged, FIG. 6 is a sectional view in which the main part is enlarged for explaining its operation and FIGS. 7 to 9 are schematic drawings for explaining the other embodiments according to the present invention.

To explain a current cutoff mechanism T according to the present invention of a cell using a square cell for example, a cell lid 11 for shielding the inside of a cell case K airtightly is attached to the cell case K in which a generating element not shown is housed by welding as shown in FIGS. 1 to 4.

The above cell lid 11 is held between an insulating member 12 attached under the cell lid and a pressing member 13 attached on the cell lid, is fastened to a rivet 14 in the center, and the cell lid 11, the insulating member 12 and the pressing member 13 are integrated.

A positive terminal 15 is attached under the rivet 14 and a conducting washer 16 is attached on the rivet. An external positive electrode 17 which conducts to the positive terminal 15 is touched to the conducting washer 16 on the above rivet 14. An internal electrode 18 provided with a lead 18a and composed of a negative terminal is riveted on the right side in the drawings of the insulating member 12.

To explain the details of the above current cutoff mechanism T of a cell, the shape of the cell lid 11 is approximately rectangular and the cell lid is made of a conductive metallic plate such as stainless steel. The cell lid 11 is composed of a hooked part 11a in its outside part and a flat bottom plate 11b formed by protruding the inside of the hooked part 11a downward by drawing.

In a part of the above bottom plate 11b, for example, a diaphragm D shown on the right side in FIG. 2 and a relief valve Z shown on the left side are integrated with the cell lid 11.

As for the above diaphragm D, as shown in a sectional view shown in FIG. 5 in which the main part is enlarged, a thin part 11d is provided by a circular concave portion 11c formed by grinding from the side of the lower surface of the bottom plate 11b. The above thin part 11d is pressed downward inside the cell case K in FIG. 5 so that the thin part is in the shape of a bowl and a convex portion 11e is protruded downward in FIG. 5 from the center of the protruded thin part 11d.

The above diaphragm D is composed of the convex portion 11e protruded from the center and the thin part 11d formed by the concave portion 11c around the convex portion 11e, and the convex portion 11e in the center can be displaced above and below using the base of the thin part 11d on the outside of the concave portion 11c as a fulcrum.

The relief valve Z is composed of a flat thick protruded part 11f the shape of which is circular and which is protruded upward and a coupling part 11g formed by thinning the base of the protruded part 11f.

The insulating member 12 which is formed so that the insulating member is smaller than the outer shape of the cell lid 11 and which is formed by rectangular resin is attached to the lower surface of the bottom plate 11b of the above cell lid 11. In the above insulating member 12, a lead inserting hole 12a is formed below the convex portion 11e of the diaphragm D and first air vents 12b are formed in four locations around the lead inserting hole 12a.

A second air vent 12c which is larger than the outer diameter of the relief valve Z is formed under the relief valve Z. A cylindrical part 12e provided with a central hole 12d into which a rivet 14 is inserted is protruded upward from the center of the above insulating member 12.

A riveted part 12f is protruded downward near the right end of the insulating member 12.

A pressing member 13 is arranged on the bottom plate 11b of the cell lid 11 so that the cell lid 11 is supported by the insulating member 12 and the pressing member 13 between them.

The above pressing member 13 is made of insulating material and in the center, a central hole 13a for inserting the cylindrical part 12e of the insulating member 12 is formed In the pressing member 13 over the diaphragm D, a first concave portion 13b is formed as a relief hole when the diaphragm D is displaced upward and a third air vent 13c is formed over the first concave portion 13b. As air in the first concave portion 13*b* is emitted outside because of the above third air vent 13*c* when the thin part lid of the diaphragm D is displaced upward, the diaphragm D can be displaced smoothly.

In the pressing member 13, a second concave portion 13*d* is formed over the relief valve Z and a fourth air vent 13*e* is formed over the second concave portion 13*d*.

A rivet 14 made of aluminum is inserted into the central hole 12*d* of the above insulating member 12 and in the rivet 14, its head 14*a* is formed in the lower part and the end 14*b* protruded from the cylindrical part 12*e* is formed in the upper part.

A positive terminal 15 bent approximately in the shape of a letter L is held between the head 14*a* of the rivet 14 and the insulating member 12 on the lower side of the insulating member 12, the end 14*b* of the rivet 14 is riveted on the upper side of the pressing member 13 and a conducting washer 16 made of a metallic plate and approximately in the shape of a bowl is attached to the end of the rivet.

An external positive electrode 17 is arranged on the riveted end 14*b* of the rivet 14. The external positive electrode 17 is attached to a hooked part in the outside part of the conducting washer 16 by spot welding. The above external positive electrode 17 is made of a steel plate, nickeling are applied to the surface, and the external positive electrode 17 and the positive terminal 15 are electrically connected via the rivet 14.

As for the above internal electrode 18, its lead 18*a* is formed to be flat and as shown in FIG. 4, a terminal 18*b* is formed by bending the end of the lead 18*a* downward in the shape of a letter.

A cylindrical projection 18*c* protruded in the lead inserting hole 12*a* above the above lead 18*a* is formed on the left side shown in FIG. 5 by drawing.

In the above projection 18*c*, a base 18*e* which is also a ceiling is formed in the upper part and a fitted part 18*f* which is a through hole formed by press working is formed in the vicinity of the center which is a part of the base 18*e*.

As for the internal electrode 18, the projection 18*c* is inserted into the lead inserting hole 12*a*, the convex portion 11*e* of the diaphragm D is press-fitted into the fitted part 18*f* in this state, and the convex portion 11*e* and the fitted part 18*f* are electrically connected.

In four locations of the lead 18*a* around the above projection 18*c*, as shown in FIG. 3, a notch 18*g* communicating with the first air vent 12*b* of the insulating member 12 is formed.

On the right side of the lead 18*a* shown in FIG. 3, a rivet hole 18*h* is formed, the rivet hole 18*h* is fitted to the riveted part 12*f* of the insulating member 12 and as a result, the internal electrode 18 is attached to the insulating member 12.

In the current cutoff mechanism T composed as described above of a cell, as shown in FIG. 2, the hooked part 11*a* in the outside part of the cell lid 11 is attached to the cell case K in which a generating element not shown is housed by welding and the inside of the cell case K is airtightly shielded.

In a cell to which the current cutoff mechanism T is attached, a conductive path is formed between the cell lid 11 and a negative element not shown of the above generating element via the diaphragm D and the internal electrode 18.

As for the operation of the above current cutoff mechanism T of a cell according to the present invention, when an abnormality occurs inside the cell and pressure inside the cell is increased, the pressure of gas inside the cell is increased enters the concave portion 11*c* from four first air vents 12*b* as shown by an arrow B in FIG. 6.

Then, application force which pushes up the thin part lid upward is applied to the diaphragm D by the gas whose pressure is increased.

When pressure inside the cell exceeds a predetermined value, force which pulls out the convex portion 11*e* press-fitted into the fitted part 18*f* upward is applied to the thin part lid by application force applied to the diaphragm D.

The convex portion 11*e* is pulled out from the fitted part 18*f* and the thin part 11*d* of the diaphragm D is displaced upward at a stroke and is inverted.

The diaphragm D and the internal electrode 18 are separated by the upward inversion of the diaphragm D and a conductive path between the cell lid 11 and the negative element not shown of the generating element inside the cell is cut off. The increase of pressure inside the cell case K is prevented by the above cutoff of the conductive path and the cell can be prevented from bursting beforehand.

If the increase of pressure inside the cell is not stopped and further, pressure inside the cell is increased though the conductive path between the cell lid 11 and the generating element not shown inside the cell is cut off, further increased pressure inside the cell is applied to the protruded part 11*f* of the relief valve Z, application force which pushes up the protruded part 11*f* operates, the coupling part 11*g* formed in the thin part is broken by the above application force, high pressure gas inside the cell is exhausted outside from the broken part and the cell can be prevented from bursting beforehand.

Referring to FIGS. 7 to 9, the other embodiments of the diaphragm D in the above current cutoff mechanism T of the cell according to the present invention and the internal electrode 18 will be described below.

First, as for the other first embodiment, as shown in FIGS. 7A and 7B, plural slits 28*j* extended radially from the center of a base 28*e* of a protruded part 28*c* are formed, each tongue 28*k* is provided to a part between the plural slits 28*j*, these plural tongues 28*k* are protruded upward in a conic shape and a fitted part 28*f* is formed by the tops of these plural tongues 28*k*.

A jig not shown in the same shape is located on each lower surface of the plural tongues 28*k* in a conic shape and a convex portion 11*e* of a diaphragm is press-fitted into the fitted part 28*f*.

As for the other second embodiment, as shown in FIG. 8, the end 21*f* of a convex portion 21*e* of a diaphragm D is formed so that the end is wider than the base 21*g* fitted into a fitted part 18*f* and the wider end 21*f* may be also press-fitted into the fitted part 18*f*.

For a method of forming the above wide end 21*f*, for example, first, the end 21*f* and the base 21*g* are formed so that each diameter is equal and the end is press-fitted into the fitted part 18*f*. Afterward, the end 21*f* is tapped using a tool not shown and the end 21*f* may be also made wider than the base 21*g*.

As for the other third embodiment, as shown in FIG. 9, a fitted part 38*f* formed at the base 38*e* is formed by drawing in the shape of a bag having a hollow part 38*h* whose entrance 38*g* is narrow and the inside is wider than the entrance 38*g*, a convex portion 31*e* of a diaphragm D is formed so that its end 31*g* is wider than the base 31*f* and the wider end 31*g* may be also press-fitted into the hollow part 38*h* of the fitted part 38*f* in the shape of a bag.

As in the current cutoff mechanism according to the present invention of the cell, the above convex portion of the diaphragm is press-fitted into the above fitted part, a conductive path is formed between the above cell lid and the above generating element via the diaphragm and the above internal electrode, the above convex portion of the diaphragm is pulled out from the fitted part when the internal pressure of the above cell case exceeds a predetermined value and the diaphragm is displaced and the above conductive path is cut off, the cutoff mechanism of a cell wherein the strength of the application force of the diaphragm can be readily adjusted by regulating the depth of press fit in which the convex portion is press-fitted into the fitted part and optimum application force can be readily acquired can be provided.

The dispersion of the dimension can be reduced by forming the convex portion and the fitted part by press working and the dispersion of the application force of the diaphragm can be reduced.

As the convex portion is pulled out from the fitted part and the conductive path is cut off, no metallic powder like a beard is caused from the convex portion or the fitted part and the above conductive path can be securely cut off.

As plural slits are formed so that they are radially extended from the center of the base, each tongue is provided in a part between these plural slits, each tongue is protruded approximately in a conic shape, the fitting part is formed by the tops of the plural tongues and the convex portion of the diaphragm is press-fitted into the fitted part, the tops of the tongues eat into the convex portion of the diaphragm and the application force of the diaphragm can be increased.

As the convex portion is formed so that the end is wider than the base fitted into the fitted part, the convex portion is hardly pulled out from the fitted part and the application force of the diaphragm can be increased.

As the fitted part is formed in the shape of a bag having a hollow part whose entrance is narrow and the inside is wider than the entrance and the wider end of the convex portion is press-fitted into the hollow part of the fitted part, the end of the convex portion is wider and the convex portion is hardly pulled out from the fitted part having the hollow part in the shape of a bag and the application force of the diaphragm can be further increased.

What is claimed is:

1. A current cutoff mechanism of a cell, comprising:
    a cell case in which a generating element is housed;
    a cell lid for airtightly shielding the cell case;
    a diaphragm connected to the cell lid, displaced according to the internal pressure of said cell case and provided with a convex portion in a part; and
    an internal electrode provided with a fitted part for fitting said convex portion of the diaphragm at the base, wherein:
        said convex portion of said diaphragm is press-fitted into said fitted part;
        a conductive path is formed between said cell lid and said generating element via said diaphragm and said internal electrode; and
        when the internal pressure of said cell case increases and said diaphragm is displaced, said convex portion of said diaphragm is pulled out from said fitted part and said conductive path is cut off.

2. A current cutoff mechanism of a cell according to claim 1, wherein:
    plural slits are formed so that they are radially extended from the center of said base;
    each tongue is provided in a part between these plural slits;
    these plural tongues are protruded approximately in a conic shape and said fitted part is formed by the tops of said plural tongues; and
    said convex portion of said diaphragm is press-fitted into the fitted part.

3. A current cutoff mechanism of a cell according to claim 1, wherein:
    said convex portion is formed so that the end is wider than the base fitted into said fitted part.

4. A current cutoff mechanism of a cell according to claim 3, wherein:
    said fitted part is formed in the shape of a bag having a hollow part whose entrance is narrow and the inside is wider than said entrance; and
    said wider end of said convex portion is press-fitted into said hollow part of said fitted part.

* * * * *